United States Patent [19]

Fan

[11] Patent Number: 5,881,600
[45] Date of Patent: Mar. 16, 1999

[54] TRANSMISSION FOR MOTOR VEHICLES

[75] Inventor: Jun Fan, Pulheim, Germany

[73] Assignee: Ford Global Technologies, Inc., Dearborn, Mich.

[21] Appl. No.: 822,965

[22] Filed: Mar. 21, 1997

[30] Foreign Application Priority Data

Apr. 16, 1996 [DE] Germany ................. 196 14 930.4

[51] Int. Cl.$^6$ .................. B60K 17/06; F16H 61/00
[52] U.S. Cl. ............................. 74/329; 74/330
[58] Field of Search ............... 74/325, 329, 330

[56] References Cited

U.S. PATENT DOCUMENTS

| | | | |
|---|---|---|---|
| 4,483,210 | 11/1984 | Mayuzumi | 74/329 |
| 5,335,562 | 8/1994 | Mastroiannii et al. | 74/329 |
| 5,383,375 | 1/1995 | Ogawa et al. | 74/330 |
| 5,390,559 | 2/1995 | Thomas et al. | 74/325 |

FOREIGN PATENT DOCUMENTS

| | | |
|---|---|---|
| 3445519 C2 | 11/1992 | Germany . |
| 3729818 C2 | 11/1992 | Germany . |
| 57-110864 | 7/1982 | Japan ................. 74/325 |
| 6-185583 | 7/1994 | Japan ................. 74/325 |
| 2006380 | 1/1994 | Russian Federation ............. 74/325 |

*Primary Examiner*—Khoi Q. Ta
*Attorney, Agent, or Firm*—James J. Dottavio

[57] ABSTRACT

A transmission for a motor vehicle, including an input shaft a countershaft parallel the input shaft, an output shaft arranged coaxial with the input shaft and a plurality of speed ratio gearwheel pairs. One gearwheel of each speed ratio gearwheel pair is carried on the countershaft and the other gearwheel carried on either the input shaft or output shaft. Each speed ratio pair comprises a fixed gearwheel and a loose gearwheel. A constant ratio is arranged between the countershaft either the input shaft or output shaft for transmitting a selected speed ratio from the input shaft to the output shaft. An input synchronizer releasably connects and releases the input shaft and the countershaft.

16 Claims, 8 Drawing Sheets

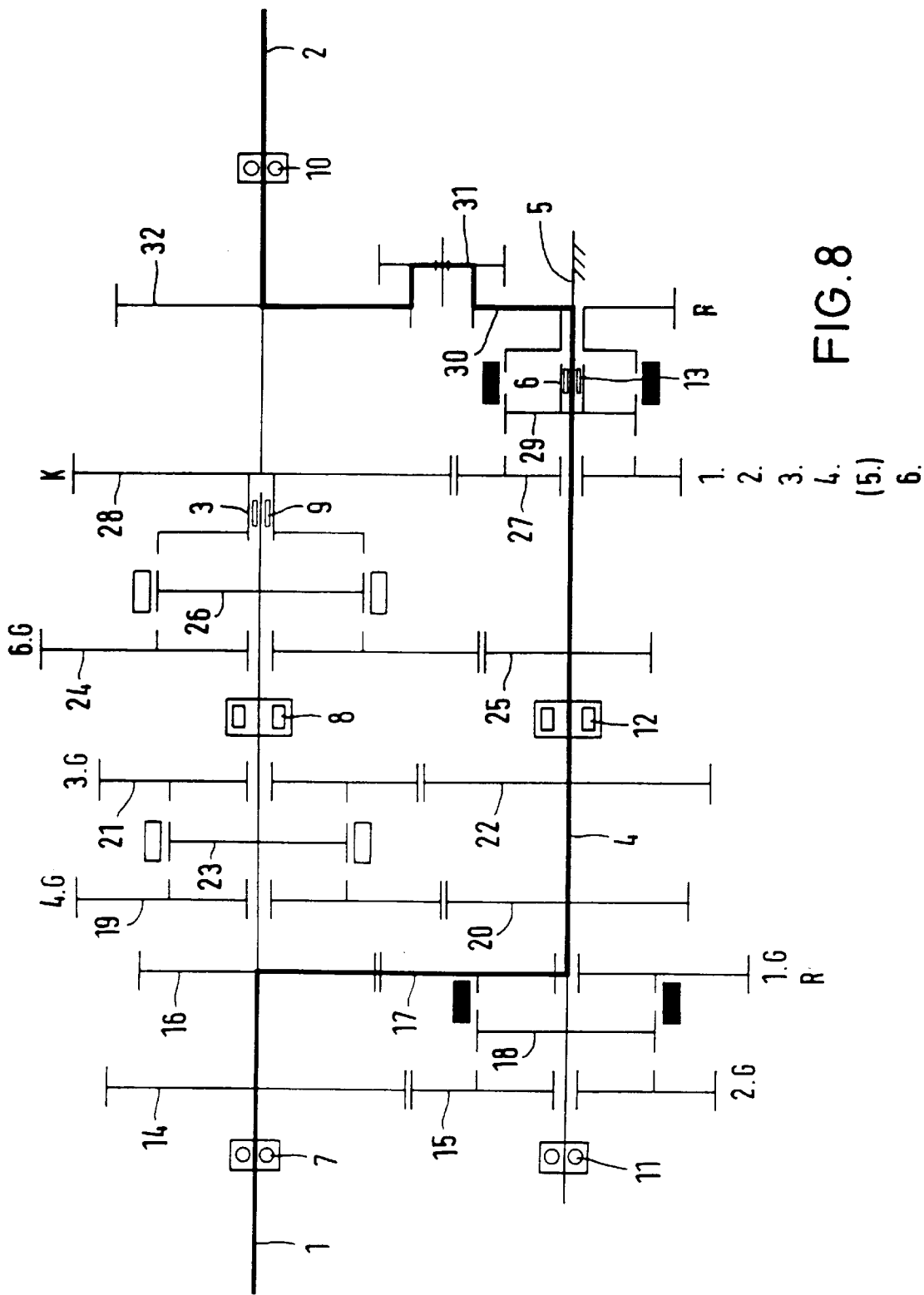

TRANSMISSION FOR MOTOR VEHICLES

BACKGROUND OF THE INVENTION

1. Field of the Invention

The invention relates to a transmission for a motor vehicle, and more particularly to a transmission comprising an input shaft, a countershaft, and an output shaft arranged concentrically with the input shaft and the output shaft journalled to the input shaft, a pair of gearwheels arranged between the input or output shaft, and the countershaft constituting a constant ratio, and a plurality of pairs of gearwheels carried on the gear shafts and each comprising a fixed gearwheel and a loose gearwheel for engaging the various gear steps.

2. Description of the Prior Art

A prior art transmission is shown in German specification 34 45 519 (DE '519). As shown in FIG. 1 of the DE '519 patent, the input shaft and output shaft and/or the countershaft are mounted in three bearings and a synchronizer unit for engaging the 5th gear and the reverse gear is provided on the countershaft.

The transmission in the DE '519 patent has the disadvantage that the gearwheel pair for the constant ratio is arranged directly on a short input shaft and at the input end of the countershaft for all the following gear steps. This results in the disadvantage that when the transmission is in the neutral position with the friction clutch engaged, the input shaft constantly drives the countershaft. Thus, by way of the fixed gearwheels carried on the countershaft, the corresponding loose gearwheels on the output shaft are also driven. This leads to undesirable rattling noises in neutral, which arise from the various imperfections in the gear teeth and play between the teeth.

German specification 37 29 818 (DE '818) discloses a similar transmission, wherein a synchronizer unit for engaging the 5th gear and the synchronized reverse gear is carried on the output shaft.

The transmission of the DE '818 patent again has the disadvantage that the constant ratio is arranged directly between a short input shaft and the input end of the countershaft, and accordingly in the neutral position of the transmission with the friction clutch engaged the whole set of gearwheels on the countershaft rotates, whereby, owing to the loose gearwheels being in mesh with the fixed gearwheels, and therefore marked rattling noises can be caused.

It would therefore be desirable to provide a transmission having a neutral position wherein the gear ratios are not driven and therefore less gear noise occurs. A further object is to provide six forward gears and a synchronized reverse in such a transmission.

SUMMARY OF THE INVENTION

It is an object of the invention is to provide an improved transmission for motor vehicles which exhibits less rattling noise in the neutral position. It is a further object to provide such a transmission having five and six forward gears and a synchronized reverse gear, with the 5th gear being in the form of a direct gear. Advantages of such an arrangement include good efficiency, low heat generation, and favourable noise properties. A further advantage is the capability to provide a number of reverse gear ratios.

To this end, in accordance with the invention, a transmission is provided which includes an input shaft a countershaft parallel the input shaft, an output shaft arranged coaxially with the input shaft, and a plurality of speed ratio gearwheel pairs. One gearwheel of each speed ratio gearwheel pair is carried on the countershaft and the other gearwheel carried on either the input shaft or output shaft. Each speed ratio pair comprises a fixed gearwheel and a loose gearwheel. A constant ratio is arranged between the countershaft either the input shaft or output shaft for transmitting a selected speed ratio from the input shaft to the output shaft. An input synchronizer releasably connects and releases the input shaft and the countershaft.

By this arrangement, the occurrence of rattling noises in the neutral position of the transmission is reduced, since here only the gearwheel pairs for the 1st and 2nd gears revolve together. By forming the 5th gear as a direct gear, high efficiency is obtained for the gear step which is frequently used for fast driving, with less generation of heat owing to the lower speed of rotation of the gearwheels and a low noise level.

Advantageously, the gearwheel set for the reverse gear comprises a fixed gearwheel on the output shaft, an intermediate gearwheel, and a loose gearwheel on a stub axle arranged coaxially with the countershaft and carrying its rear end in a bearing and can be engaged via the synchronizer unit on the countershaft, which actuates the engageable constant or the reverse gear.

By this means, the 5th gear designed as a direct gear and the synchronized reverse gear are provided economically.

BRIEF DESCRIPTION OF THE DRAWINGS

FIGS. 2–8 show the torque path in the various gear steps of the transmission shown in FIG. 1.

DETAILED DESCRIPTION OF A PREFERRED EMBODIMENT

Figure 1:
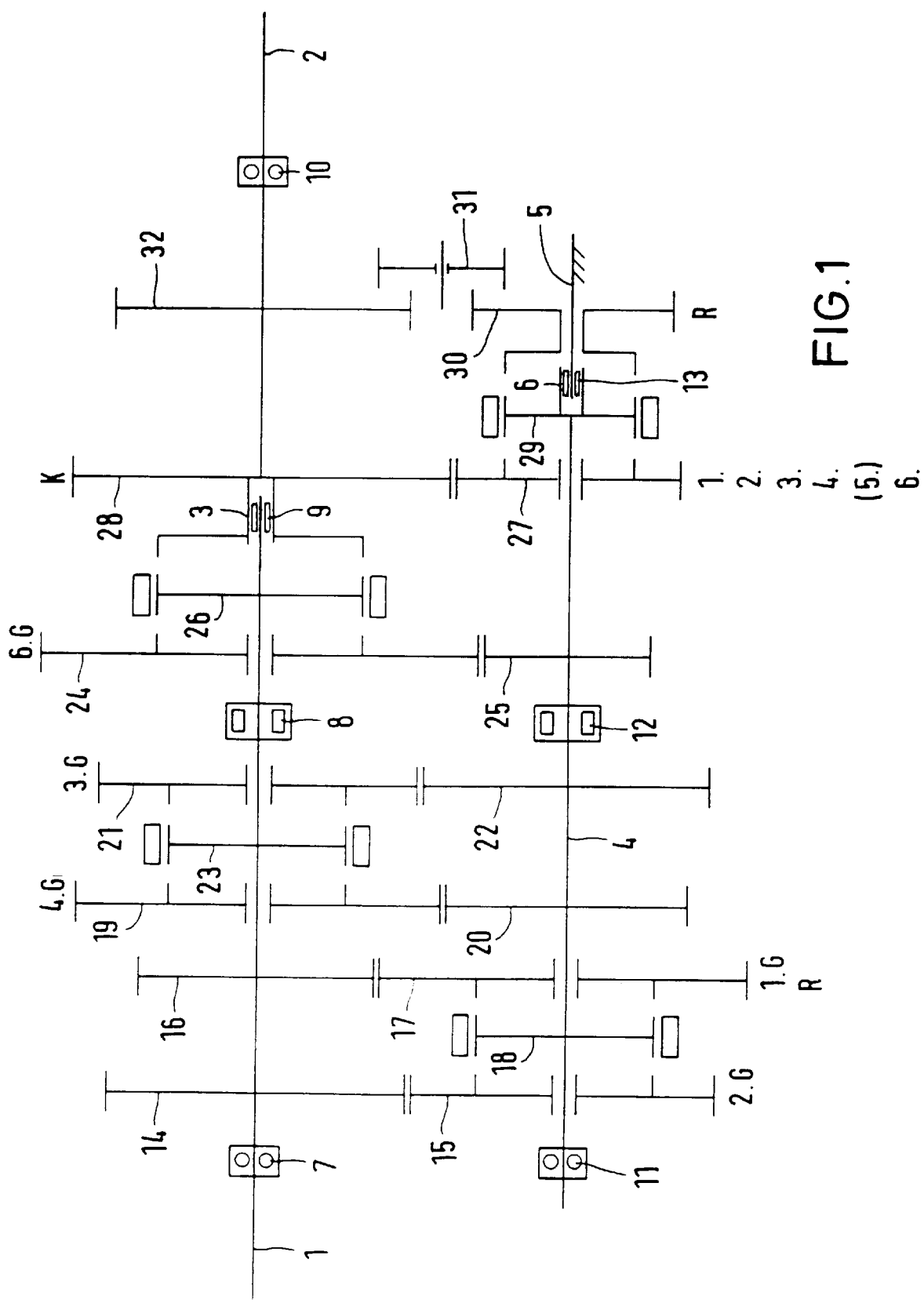
Fig. 1 shows a transmission for a motor vehicle according to the present invention.

As shown in the Figures, a transmission for motor vehicles in accordance with the present invention comprises an input shaft 1 and an output shaft 2 arranged concentrically with the input shaft 1. The front end 3 of the output shaft 2 is journalled to the input shaft 1. A countershaft 4 is arranged parallel to the input shaft 1 and to the output shaft 2. A stub axle 5 is arranged coaxial the countershaft 4. The rear end 6 of the countershaft 4 is mounted rotatably in a bearing on the stationary stub axle 5.

The shafts 1, 2, and 3 are mounted to rotate in bearings in a transmission housing (not shown) in a conventional manner. The bearings for the input shaft 1 are given the reference numerals 7 and 8, for the output shaft 2 the reference numerals 9 and 10, and for the countershaft 4 the reference numerals 11, 12 and 13.

The input shaft 1 carries a fixed gearwheel 14 for the 2nd gear and a fixed gearwheel 16 for the 1st gear and the reverse gear, and loose gearwheels 15 and 17 meshing with these are carried on the countershaft 4 and are engageable by means of a synchronizer unit 18 arranged between them.

The input shaft 1 carries loose gearwheels 19 for the 4th gear and 21 for the 3rd gear and a synchronizer unit 23 arranged between them. Fixed gearwheels 20 and 22 engaging with the loose gearwheels 19 and 21 are carried on the countershaft 4.

The input shaft 1 also carries a loose gearwheel 24 for the 6th gear, which meshes with a fixed gearwheel 25 on the countershaft 4. A synchronizer unit 26 is provided adjacent the loose gearwheel 24 for the 6th gear, by means of which both the 6th gear and the direct 5th gear can be engaged.

The countershaft 4 carries a loose gearwheel 27 of the constant ratio which is constantly in mesh with a fixed gearwheel 28 on the output shaft 2. A synchronizer unit 29 is provided adjacent the loose gearwheel 27 on the countershaft 6. The synchronizer unit 29 alternatively engages the constant ratio or a loose gearwheel 30 carried on the stationary stub axle 5. The loose gearwheel 30 is constantly in mesh with an intermediate gearwheel 31 and a fixed gearwheel 32 on the output shaft 2, thus providing a synchronized reverse gear.

FIG. 1 illustrates the transmission in a neutral state. FIGS. 2 to 8 illustrate the power flow through the transmission shown in FIG. 1 in the various gear ratios. In FIGS. 2–8, the same reference symbols are used for the same elements and the elements which are effective in the different gear steps are clearly indicated by the bold lines showing the torque path.

Figure 2:
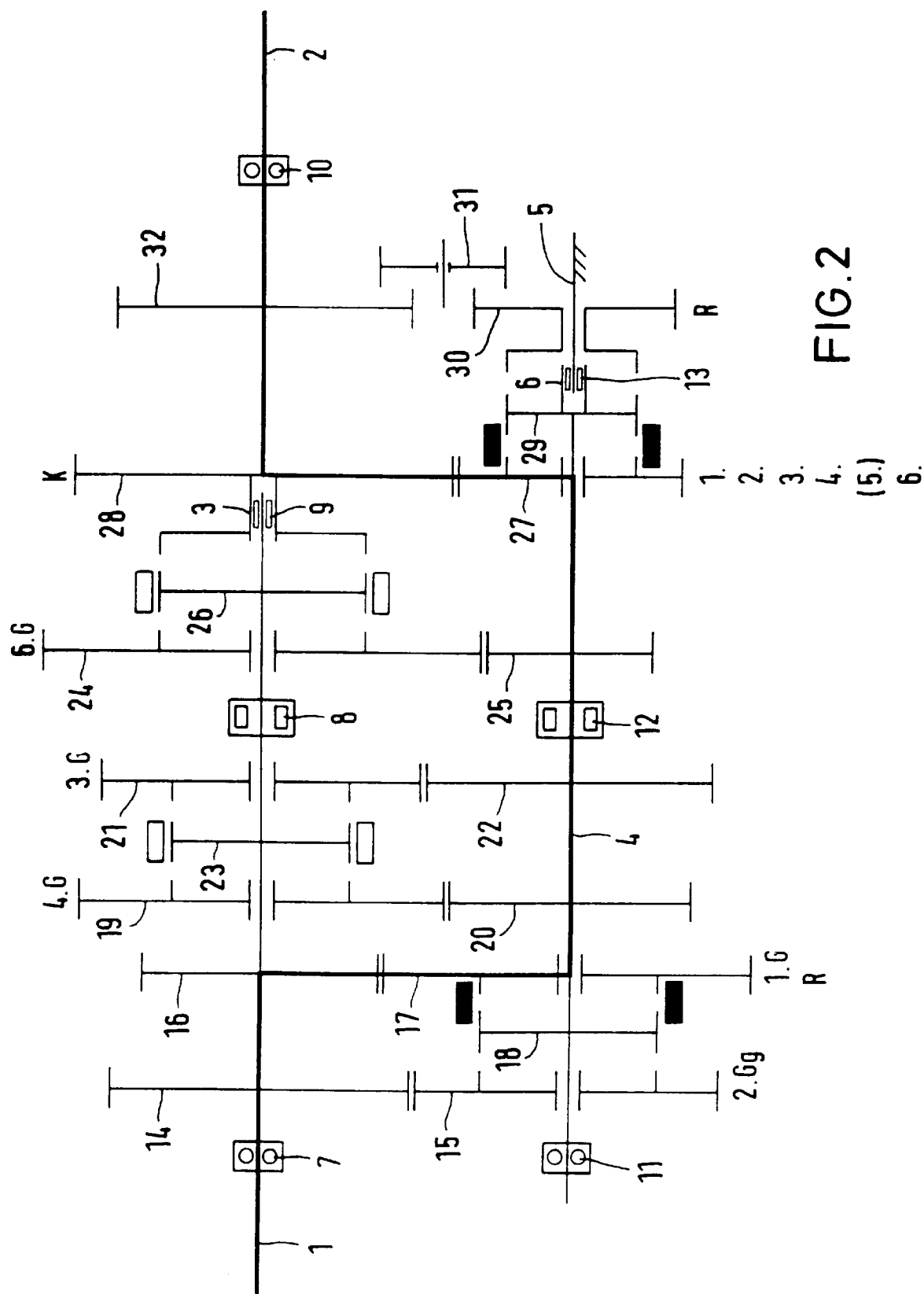
Figure 3:
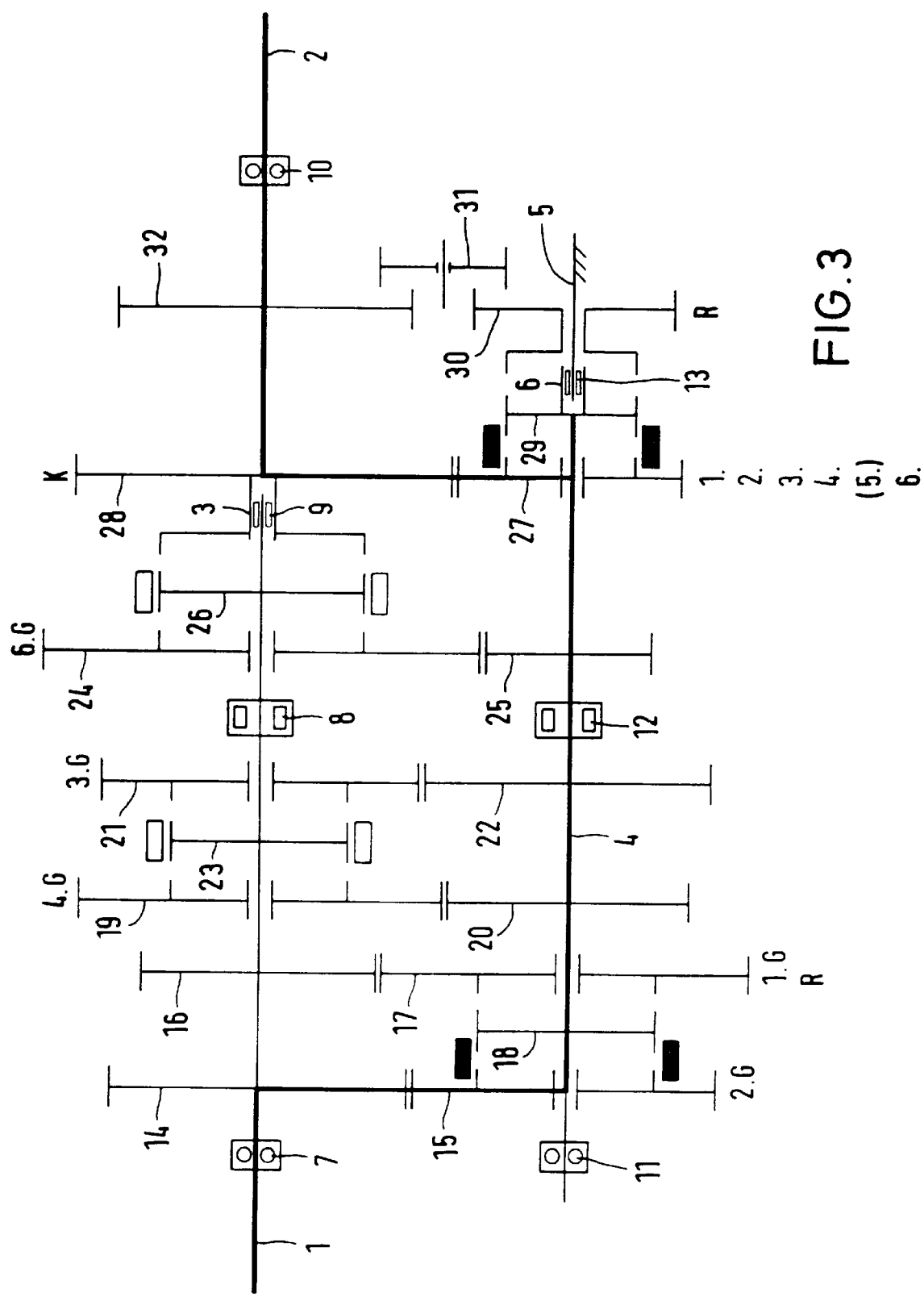
Figure 4:
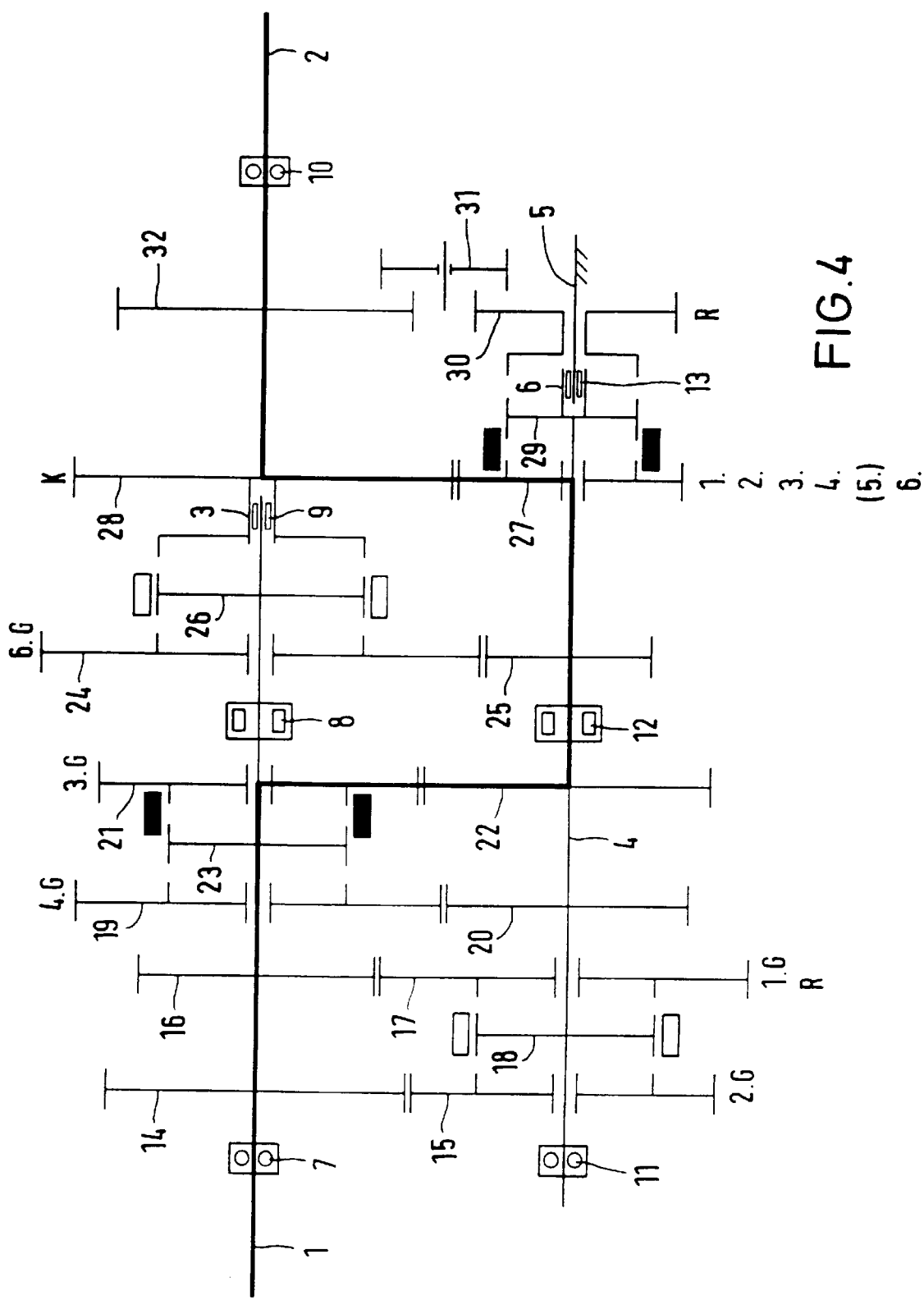
Figure 5:
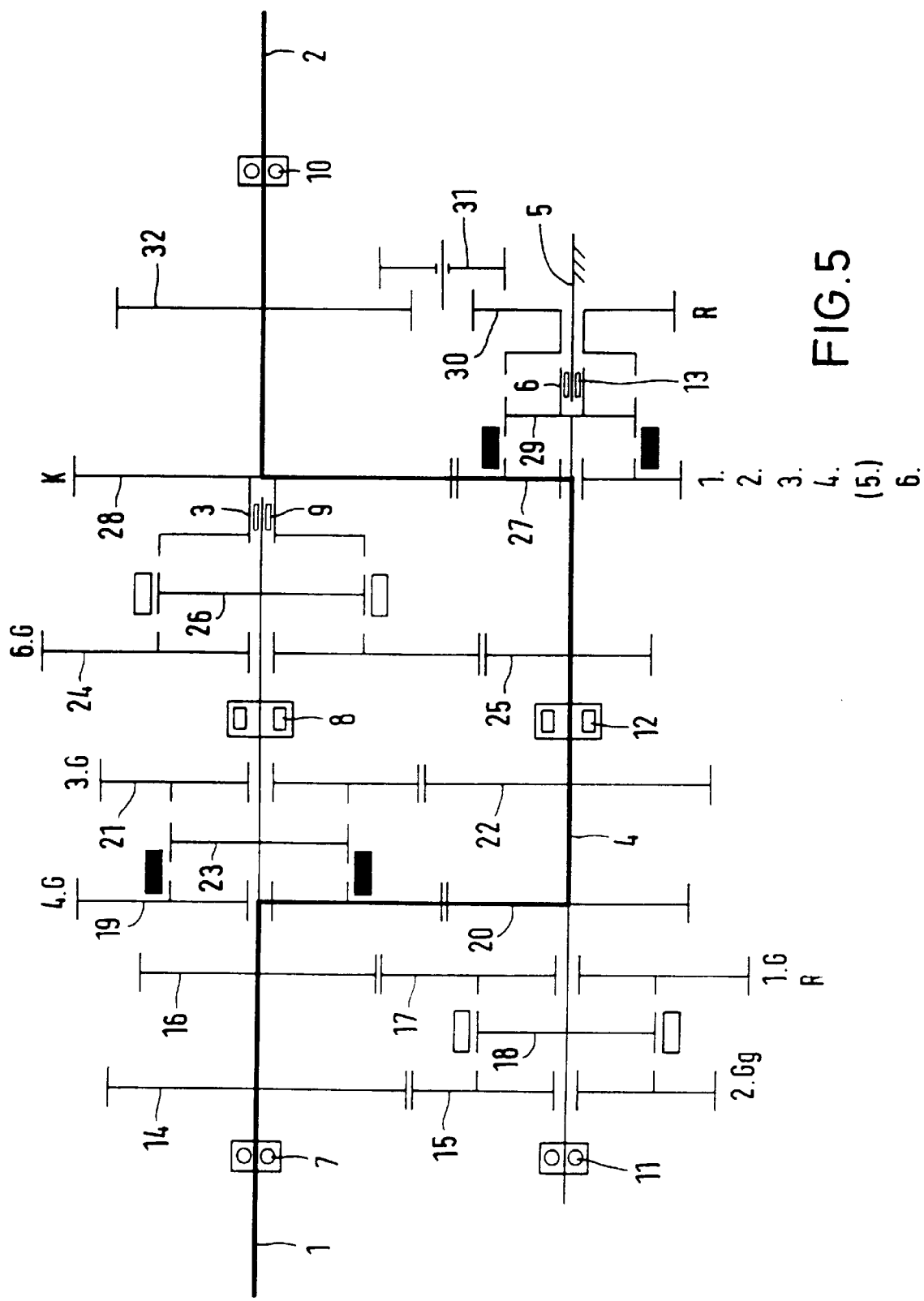

In FIG. 2, 1st gear is illustrated. Power flow travels from input shaft 1 to the first fixed gearwheel 16 to loose gearwheel 17 through synchronizer unit 18, to countershaft 4, through constant ratio synchronizer 29 to loose gearwheel 27, fixed gearwheel 28 and output shaft 2. FIGS. 3–8 are typical for ratios 2–6 and R, respectively. Because the power flow in FIGS. 3–8 is similarly indicated by bold lines, a detailed discussion of FIGS. 3–8 is s unnecessary.

As shown in FIG. 1, when the transmission is in the neutral position and the friction clutch (not shown) is engaged, only the gearwheel pairs of the 1st and 2nd gears revolve together 14, 15, 16 and 17, so that only these pairs of gearwheels can produce rattling noises. These, however, can be kept under control by suitable finish machining.

As shown in FIGS. 2, 3, 4, 5 and 7, in addition to the pair of gearwheels respectively necessary for the corresponding gear step, the gear step of the constant ratio 27, 28 must also be engaged.

Figure 6:
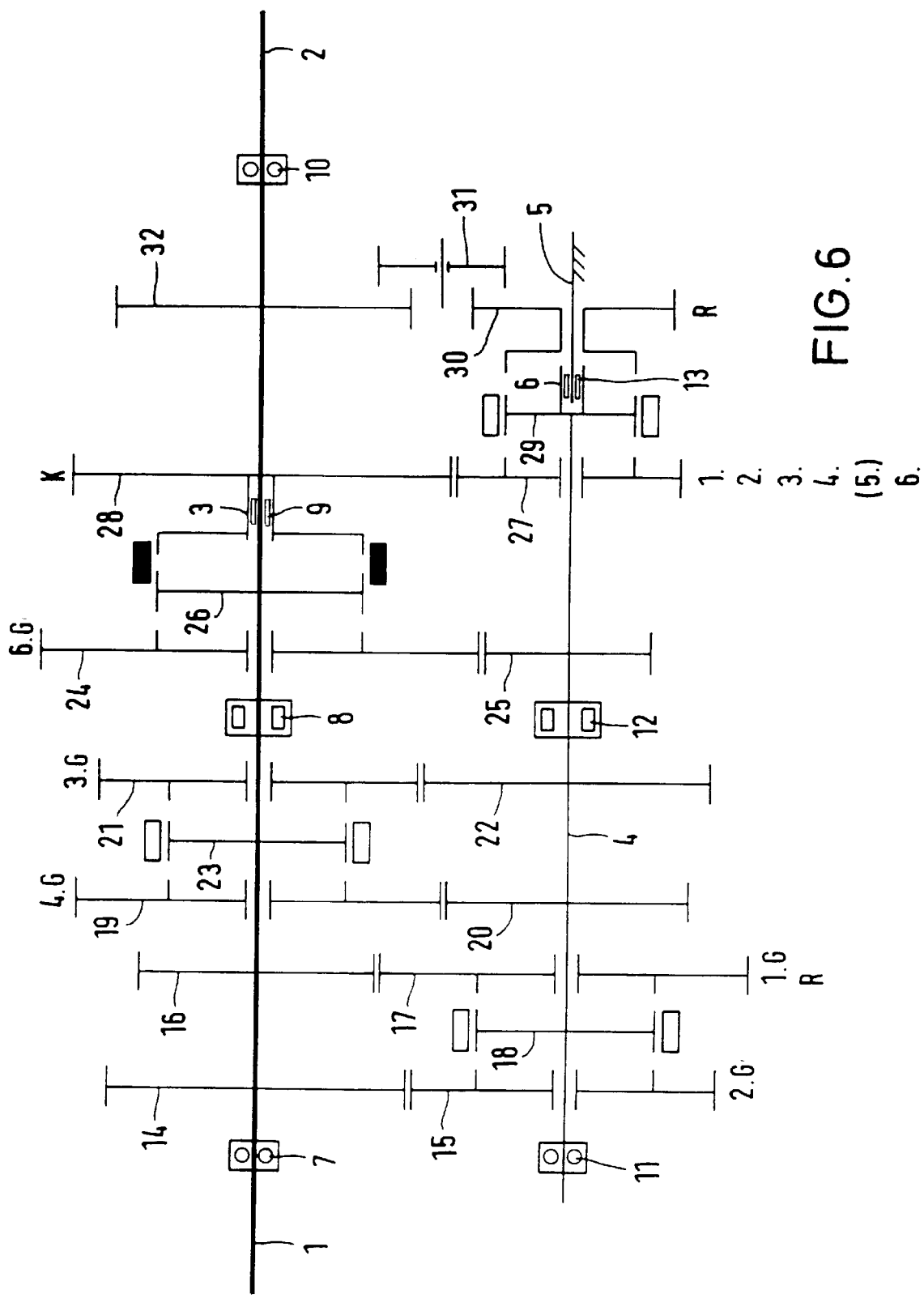
Figure 7:
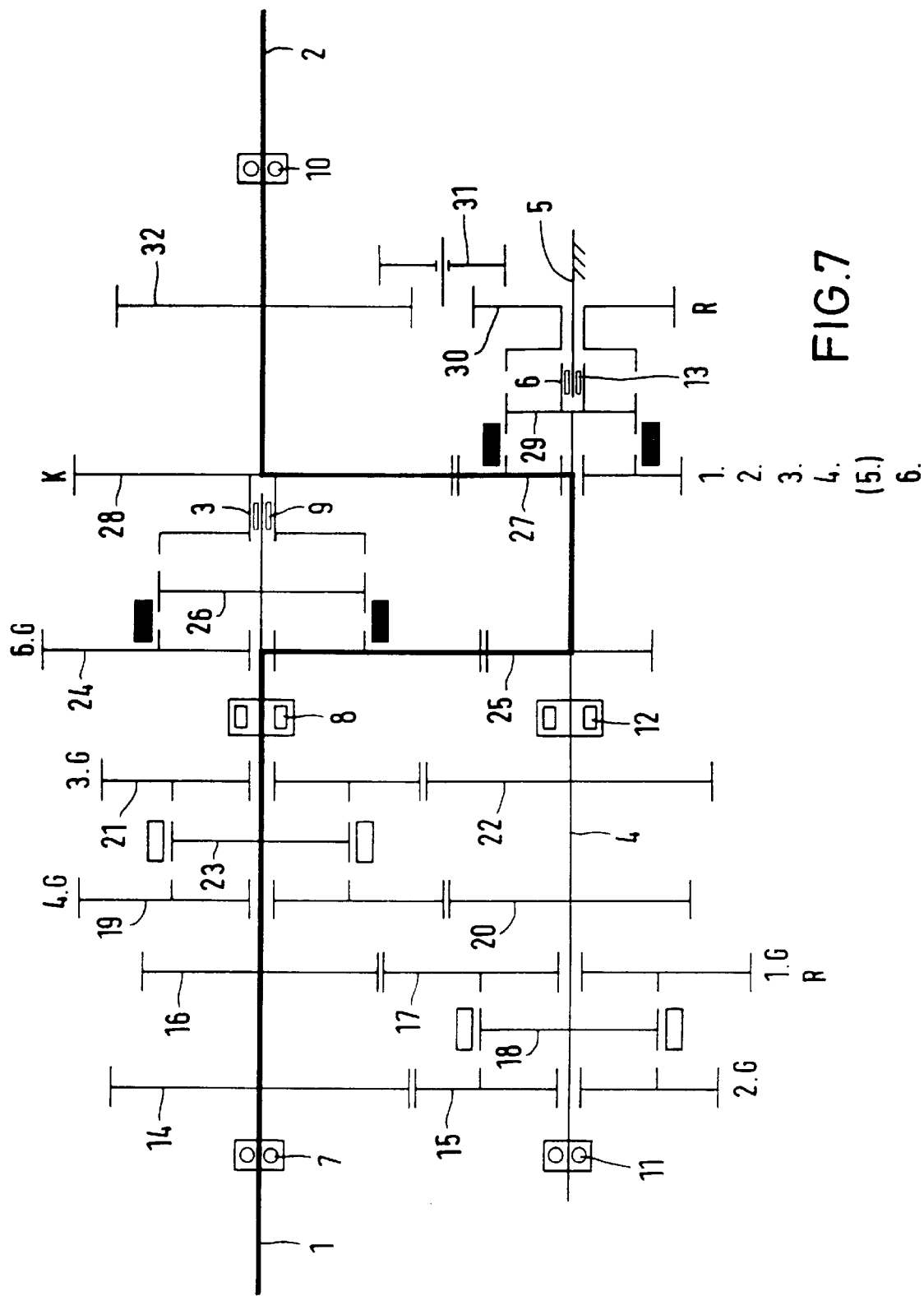

As shown in FIG. 6, the 5th gear is designed as a direct gear, whereby high efficiency, low heat generation and a low noise level is produced in this very frequently used gear. Thus, power flow occurs from input shaft 1 through synchronizer 26 to the output shaft 2. Thus, no driving engagement of the countershaft 4 occurs.

In FIG. 8 the torque path for the synchronized reverse gear is indicated. Both the synchronizer unit 18 for the 1st gear and also the synchronizer unit 29 for the reverse gear must be actuated.

One skilled in the art would recognize the relationship of any of the pairs of fixed and loose gear wheels may be reversed in an alternative embodiment, as long as the location of the respective synchronizer were also revised. For example, gearwheels 14 and 16 could be provided loosely on the input shaft 1 and synchronizing unit 18 provided therebetween to drivably engage these gearwheels with the input shaft. In this embodiment, gearwheels 15 and 17 would be fixed to the countershaft to provide power flow for these gear ratios. In this embodiment, power flow occurs from the input shaft 1, through the synchronizer 18, to loose gearwheel 16 or 14 to the respective fixed gearwheel 15 or 17.

Furthermore, several reverse ratios could be provided in the transmission described above. The reverse ratio 30, 31, 32 could be engaged for any of the forward ratios input to the countershaft, potentially creating five reverse ratios if desired.

In a further alternative embodiment (not shown), the constant ratio is provided between the input shaft and the countershaft. A loose gearwheel is carried by the input shaft and a synchronizing unit is provided adjacent thereto. The synchronizing unit alternatively drivably connects the input shaft to the loose gearwheel to drivably connect the countershaft and the output shaft. Thus, when the constant ratio is driven, the countershaft rotates. The countershaft in this embodiment carries a plurality of loose gearwheels meshingly engaged with a plurality of fixed gearwheels carried by the output shaft. The various gear ratios are selected by engaging a synchronizer with the desired loose gearwheel on the countershaft to drive the fixed gearwheel on the output shaft. Thus, the powerflow for gears 1, 2, 3, 4, 6, and reverse flows from the input shaft through the synchronizer to the constant ratio to the countershaft through a selected synchronizer carried on the countershaft through a selected gearset to the output shaft. 5th gear is provided as described above by engaging the synchronizer carried by the input shaft to engage the output shaft. Reverse is provided in a manner similar to that described above.

Although the preferred embodiments of the present invention has been disclosed, various changes and modifications may be made without departing from the scope of the invention as set forth in the appended claims.

I claim:

1. A transmission for a motor vehicle, comprising:

an input shaft;

a countershaft provided parallel the input shaft;

an output shaft arranged coaxial with the input shaft;

a plurality of speed ratio gearwheel pairs, one gearwheel of each speed ratio gearwheel pair being carried, respectively, on the countershaft and the other gearwheel of each speed ratio gearwheel pair carried on one of the group comprising the input shaft and output shaft, and each speed ratio pair comprising a fixed gearwheel and a loose gearwheel;

a constant ratio comprising a constant ratio pair of gearwheels, one of the constant ratio pair arranged on the countershaft and a second one of the constant ratio pair arranged on one of the group comprising the input shaft and output shaft for transmitting a selected speed ratio from the input shaft to the output shaft;

an input synchronizer for releasably connecting and releasing the input shaft and the countershaft; and an output synchronizer for releasably connecting the countershaft and the output shaft.

2. A transmission according to claim 1, further comprising a direct drive clutch for drivably connecting the input shaft to the output shaft for a direct drive ratio while the input synchronizer is not engaged.

3. A transmission according to claim 2, wherein the direct drive clutch comprises a synchronizer for alternatively connecting the input shaft to the output shaft and one of the plurality of speed ratios to the countershaft.

4. A transmission according to claim 3, further comprising the output shaft having a first end journalled to the input shaft.

5. A transmission according to claim 4, wherein the input synchronizer comprises a plurality of speed ratio synchronizers for releasably drivably engaging the speed ratio gearwheel pairs.

6. A transmission according to claim 5 wherein one gearwheel of each speed ratio gearwheel pair is carried on the input shaft and each speed ratio releasably connects the input shaft to the countershaft.

7. A transmission according to claim 1, wherein the constant ratio further comprises a loose gearwheel carried on the countershaft and a fixed gearwheel carried on the output shaft; the output synchronizer releasably connecting the constant ratio gearset.

8. A transmission according to claim 7 wherein the output synchronizer alternatively drivably engages a reverse ratio.

9. A transmission according to claim 8 wherein the reverse ratio comprises a fixed gearwheel carried on the output shaft, an intermediate gearwheel and a loose gearwheel on a stub axle arranged coaxially with the countershaft journalled to the stub axle at one end thereof.

10. A transmission for a motor vehicle, comprising:

an input shaft;

a countershaft provided parallel the input shaft;

an output shaft arranged coaxial with the input shaft and journalled at one end thereto;

a plurality of speed ratio gearwheel pairs, one gearwheel of each speed ratio gearwheel pair being carried, respectively, on the countershaft and the other gearwheel of each of the speed ratio gearwheel pair carried on one of the group comprising the input shaft and output shaft, and each speed ratio pair comprising a fixed gearwheel and a loose gearwheel;

a constant ratio comprising a constant ratio pair of gearwheels, one gearwheel of the constant ratio pair arranged on the countershaft and a second gearwheel of the constant ratio pair arranged on one of the group comprising the input shaft and output shaft for transmitting a selected speed ratio from the input shaft to the output shaft;

a plurality of speed ratio synchronizers for releasably connecting and releasing the input shaft and the countershaft; and an output synchronizer for releasably connecting the countershaft and the output shaft.

11. A transmission according to claim 10, further comprising a direct drive synchronizer for drivably connecting the input shaft to the output shaft for a direct drive ratio while the speed ratio synchronizers are not engaged.

12. A transmission according to claim 11, wherein the direct drive synchronizer alternatively connects the input shaft to the output shaft and one of the plurality of speed ratios to the countershaft.

13. A transmission according to claim 10, wherein the output synchronizer alternatively driveably engages a reverse ratio.

14. A transmission according to claim 13 wherein the reverse ratio comprises a fixed gearwheel carried on the output shaft, an intermediate gearwheel and a loose gearwheel on a stub axle arranged coaxially with the countershaft journalled to the stub axle at one end thereof.

15. A method of providing a plurality of forward gear ratios in a transmission having an input shaft carrying a plurality of speed ratio input gearwheels, a countershaft arranged parallel the input shaft, the countershaft carrying a plurality speed ratio gearwheels in meshing engagement with the input gearwheels, and an output shaft coaxial with the input shaft, the method comprising:

releasably connecting the input shaft to the countershaft;

directly releasably connecting the input shaft and the output shaft when the input shaft is drivably disconnected from the countershaft;

providing a constant ratio between the countershaft and the output shaft for drivably connecting the countershaft and output shaft; and releasably connecting the countershaft and output shaft though a synchronizer.

16. A method according to claim 15, wherein the constant ratio synchronizer alternatively releasably connects a reverse ratio between the countershaft and output shaft.

* * * * *